United States Patent
Rozenberg

(10) Patent No.: US 11,151,687 B2
(45) Date of Patent: Oct. 19, 2021

(54) METHOD FOR OBTAINING 360° PANORAMA IMAGES TO BE CONTINUOUSLY DISPLAYED BY A TWO-DIMENSIONAL MEDIUM ON A CYLINDRICAL OR CONICAL REFLECTING SURFACE THAT SIMULATES THE ACTUAL VIEW

(71) Applicant: RS LIFE360 SOCIETÀ A RESPONSABILITÀ LIMITATA, Rome (IT)

(72) Inventor: Eliyahu Rozenberg, Rome (IT)

(73) Assignee: RS LIFE360 SOCIETÀ A RESPONSABILITÀ LIMITATA, Rome (IT)

( * ) Notice: Subject to any disclaimer, the term of this patent is extended or adjusted under 35 U.S.C. 154(b) by 22 days.

(21) Appl. No.: 16/612,899

(22) PCT Filed: May 8, 2018

(86) PCT No.: PCT/IB2018/053175
§ 371 (c)(1),
(2) Date: Nov. 12, 2019

(87) PCT Pub. No.: WO2018/207084
PCT Pub. Date: Nov. 15, 2018

(65) Prior Publication Data
US 2020/0082497 A1    Mar. 12, 2020

(30) Foreign Application Priority Data

May 10, 2017 (IT) .......................... 102017000050472

(51) Int. Cl.
*G06T 3/00* (2006.01)
*G06T 5/00* (2006.01)

(52) U.S. Cl.
CPC ............ *G06T 3/005* (2013.01); *G06T 3/0006* (2013.01); *G06T 5/006* (2013.01); *G06T 2207/20221* (2013.01)

(58) Field of Classification Search
None
See application file for complete search history.

(56) References Cited

U.S. PATENT DOCUMENTS 9,367,951 B1    6/2016  Gray
10,269,155 B1 *  4/2019  Brailovskiy .......... G06T 3/4038
(Continued)

FOREIGN PATENT DOCUMENTS

FR    2 176 426       10/1973
JP    2016-145855     8/2016

OTHER PUBLICATIONS

Park, "Study on Three-Dimensional Anamorphic Volumetric Display System." PhD diss., Aug. 2012. (Year: 2012).*
(Continued)

*Primary Examiner* — Steven Z Elbinger
(74) *Attorney, Agent, or Firm* — Nixon & Vanderhye

(57) ABSTRACT

Anamorphic system for the acquisition, post-production and reproduction of 360° panorama images on three-dimensional objects, suitable for the representation of panorama images deformed according to the principle of anamorphosis on a two-dimensional medium, the image being adapted to be reflected on the outer surface of a three-dimensional medium positioned centrally with respect to the two-dimensional medium; the system including: (A) acquisition: wherein 360° photography shots are taken around the object; the photography shots equidistant from the object and provided with focals; the photography shots also having a mutual superimposition included between 30% and 40% of the image; the acquisition step occurring over time, for acquiring shots of the entire object; (B) post-production:
(Continued)

(a)

(b)

wherein the photography shots are edited to generate the deformed image; (C) reproduction of the image on a two-dimensional medium, the image provided with a central hole; and (D) positioning a three-dimensional medium at the central hole.

18 Claims, 6 Drawing Sheets

(56) References Cited

U.S. PATENT DOCUMENTS

| | | | | |
|---|---|---|---|---|
| 2003/0117488 A1* | 6/2003 | Pierce | ............... | H04N 5/2628 348/48 |
| 2006/0119728 A1* | 6/2006 | Shirakura | ............ | H04N 13/211 348/335 |
| 2009/0015553 A1* | 1/2009 | Hirahara | ............... | G06F 3/0488 345/158 |
| 2009/0234473 A1* | 9/2009 | Andersson | ......... | H04N 1/00307 700/94 |
| 2013/0229484 A1* | 9/2013 | Furumura | ............. | H04N 5/232 348/36 |

OTHER PUBLICATIONS

International Search Report, PCT/IB2018/053175, dated Jul. 20, 2018.
Written Opinion, PCT/IB2018/053175, dated Jul. 20, 2018.

* cited by examiner (a)

(b)

(c)

(d1)　　　　　　　　(d2)

(a)

(b)

(c)

(d)

(e)

(f)

METHOD FOR OBTAINING 360° PANORAMA IMAGES TO BE CONTINUOUSLY DISPLAYED BY A TWO-DIMENSIONAL MEDIUM ON A CYLINDRICAL OR CONICAL REFLECTING SURFACE THAT SIMULATES THE ACTUAL VIEW

FIELD OF THE ART

The present invention operates in the field of graphics and design, as well as photography, in particular in the phase of post-production of the photographic process for generating a 360° panorama image.

More in detail, the present invention regards the reproduction of 360° panorama images on three-dimensional objects, rendering them decorative objects that are particularly striking for the observer.

PRIOR ART

"Anamorphosis" is a word that derives from Greek and signifies "reconstructed form"; this is an optical illusion effect for which an image is projected on a surface in a distorted manner, rendering the original subject matter recognizable only by viewing the image from a precise position.

The original subject matter can be a flat figure or three-dimensional object. The present invention refers to the latter representation type. The observer, through a curved mirror, perceives the figure represented on a two-dimensional medium as a three-dimensional object.

In addition to numerous typical Renaissance frescoes and paintings, anamorphosis is widely used today in many different fields. In cinematographic technique, anamorphosis is used for filming a screen format with base/height ratio different from that of the film. Special anamorphic lenses compress the image laterally at the time of the filming and re-expand it during projection.

A practical use of the anamorphic effect is that practiced in executing writing for indications on the road surface, whose characters are deformed and elongated in a manner such that, when seen from a certain distance, they appear normal and legible. Other examples of anamorphosis are advertising writing designed on playing fields of various sports disciplines, which are transmitted on TV. Indeed the writing is deformed in order to appear straight from the viewpoint of the camera that films them.

Anamorphic representation, above all in recent years in which various artists have dedicated themselves to producing this image type, is also the object of numerous international patents, aimed to provide an increasingly precise and detailed optical illusion. One example thereof is the U.S. Pat. No. 9,367,951, recently filed, which describes a decorative element constituted by a two-dimensional screen on which an image is represented which—if observed from a specific range of viewing angles—is perceived by the observer to be three-dimensional.

Anamorphic representations, notwithstanding the in-depth studies to which they have been subjected, still have imperfections. In particular the anamorphic distortions of photography images still have various critical issues, starting from the deformations that do not allow a correct reproduction of the image on the three-dimensional medium, up to the problem represented by shadows.

The difficulty of the process of anamorphic distortion has ensured that up to now none of the applications of an anamorphic mirror have ever satisfactorily comprised a 360° panorama, but only partial views or simply frontal views.

Therefore, the object of the present invention is to propose a new and innovative system for the acquisition, post-production and reproduction of an image on a two-dimensional medium in a manner such that said 360° panorama image is correctly projected on a mirroring three-dimensional object with cylindrical or conical form.

DESCRIPTION OF THE INVENTION

According to the present invention, a system is attained according to which it is possible to produce three-dimensional objects which bear, on their outer surface, a panorama image referred for example to a monument or to a square.

Such system consists of a method for the acquisition and post-production of the images and, subsequently, for the reproduction of the final image on a two-dimensional medium. In particular, said final image has ring-shaped form, therefore provided with a central hole. At this hole, a three-dimensional object or medium can be advantageously positioned whose outer surface is mirroring.

Advantageously, said mirroring outer surface of said three-dimensional medium is cylindrical or substantially cylindrical and it is suitably configured for mirroring the ring-shaped image reproduced on the two-dimensional medium, returning the panorama image in correct display form.

For an optimal graphical result, advantageously, the height of the ring-shaped image will be comprised between ⅓ and twice the height of the reflecting outer surface of the three-dimensional medium. Still more advantageously, the height of the ring-shaped image, hence the difference between its outer radius and its inner radius, will be equal to the height of the mirroring outer surface of the three-dimensional medium.

Such system is particularly advantageous on specific objects, in particular those in which said three-dimensional medium is cylindrical or substantially cylindrical and in which it is possible to reproduce the ring-shaped image in a perimeter manner with respect to said three-dimensional medium.

Among the examples of objects referred to by the system of the present invention, there are the following: plates and services plates, trays, magnets, furniture pieces, vases, umbrella holders, centerpieces, mats, furnishing accessories or various other accessories, breakfast cups, small coffee cups with the relative saucers, beer mugs with the corresponding coasters, commemorative glass bottles with a special paper element to be opened on the support surface in order to act as a two-dimensional medium. Due to the present system, large-size artistic or monumental installations are also possible, for example in the busiest town squares. In addition, the system described in detail hereinbelow offers the advantageous possibility to be applied also to furnishing objects of medium-large size, such as an information desk, the counter of a bar or a reception of a hotel. In this case, the mirroring surface is the vertical surface of the counter, desk or reception, and the ring-shaped image is shown on the floor immediately adjacent to said three-dimensional object.

Due to the use of the anamorphosis technique, the surprise effect on the observer is ensured. The deformation of the image ensures that the reproduction on the three-dimensional medium is correct, indeed it renders the image represented on the two-dimensional medium nearly unrecognizable if observed from any viewpoint different from that in which the three-dimensional medium is placed.

In order to provide a complete view of the advantages offered by the present invention, the various steps are now specified of the method for the acquisition and post-production of the images for the creation of the final image that will be represented on said two-dimensional medium.

First of all, the acquisition of the images must be carried out with a plurality of photography shots characterized by focals, preferably 35 mm.

Two different techniques can be used in this step, based on the type of subject matter to be photographed. If this is a square or in any case a space, the "panorama" method will be used in which the position of the camera is fixed and rotates on itself. If the object to be photographed is a monument, a building or similar object, the "orbital" technique will be used in which the observer rotates around the object, maintaining a fixed distance therewith. In any case, it is necessary that the various photographs have a superimposition comprised between 20% and 50%, preferably between 30% and 40%, and which were preferably taken in HDR mode, i.e. high-definition mode.

Advantageously, by means of the HDR mode, each photography shot will be characterized by optimal exposure, formed by superimposing shots of which one is under-exposed to the light, one over-exposed and one average.

With respect to the known techniques, the method of the present invention, in the acquisition step, is carried out at different times of the day in order to avoid photographing the shadow zones. The same principle is applied to night or twilight photographs. In this phase, it is essential that the shots, in the different hourly periods, be taken from the same viewpoint, at the same height, with the same angle and opening of the lens.

The subsequent step is that of the post-production, wherein the photography shots are edited in order to attain the final ring-shaped image. For a correct post-production, it is first of all necessary to correct the focal aberrations by means of the use of suitable software such as, preferably, Camera Raw. Subsequently, one proceeds with the assembly of the images, still in electronic mode, and a linear panorama is generated that is provided with length/height ratio comprised between 4.5 and 2.5, preferably 3.88.

At this point, it is necessary to carry out a cutting of the upper edge and of the lower edge in order to render them linear. Therefore, one continues with saving the file, setting the dimensions thereof comprised between 100×80 and 40×20, preferably 70×40. As final steps of the post-production, in order to generate an anamorphic image, hence deformed with respect to those that one wishes to view, it is necessary to execute a deformation of the just-saved image, bringing it to dimensions comprised between 100×100 and 20×20, preferably 70×70, subsequently rotating the image thus obtained by 180° and finally transforming the coordinates thereof from rectangular to polar.

The ring-shaped image obtained by means of the above-described process is adapted to be advantageously reproduced on a plurality of two-dimensional media so as to be correctly displayed from the standpoint of the corresponding three-dimensional medium. Therefore, due to the mirroring surface, also the observer of the three-dimensional medium will have the optical illusion that the monument or the square are directly and correctly represented on the three-dimensional medium itself.

DESCRIPTION OF THE FIGURES

The invention will be described hereinbelow in at least one embodiment as a non-limiting example with the aid of the enclosed figures, in which.

DETAILED DESCRIPTION OF THE INVENTION

The present invention will now be illustrated as a merely non-limiting or non-constraining example, making use of the figures which illustrate several embodiments relative to the present inventive concept.

Figure 2A:
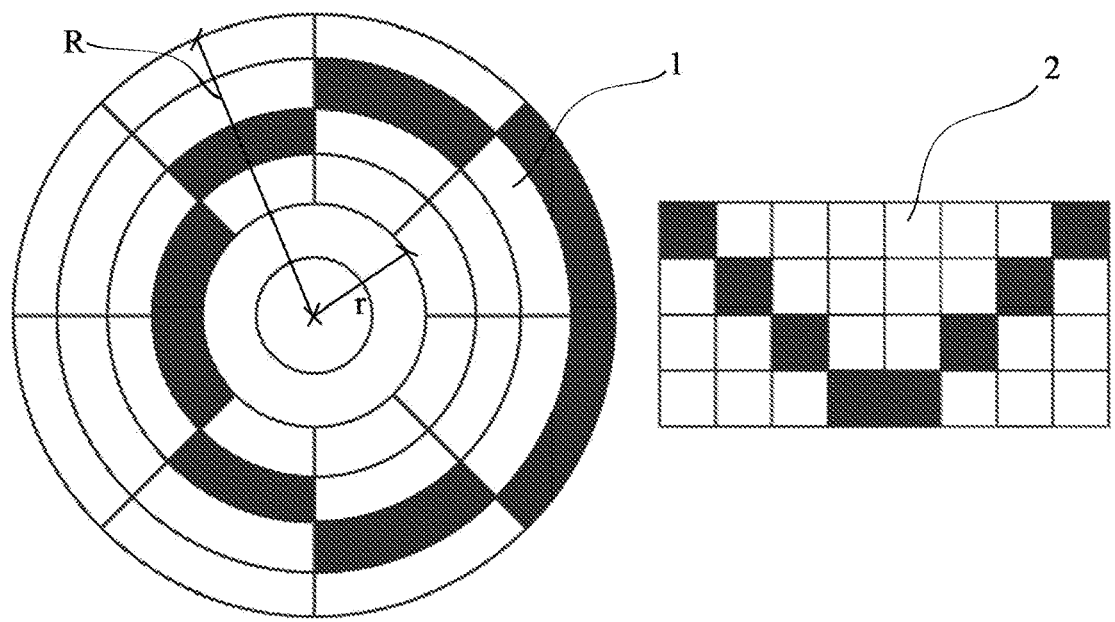
FIG. 2 illustrates the schematization of the anamorphic principle of deformation of the image.
Figure 2B:
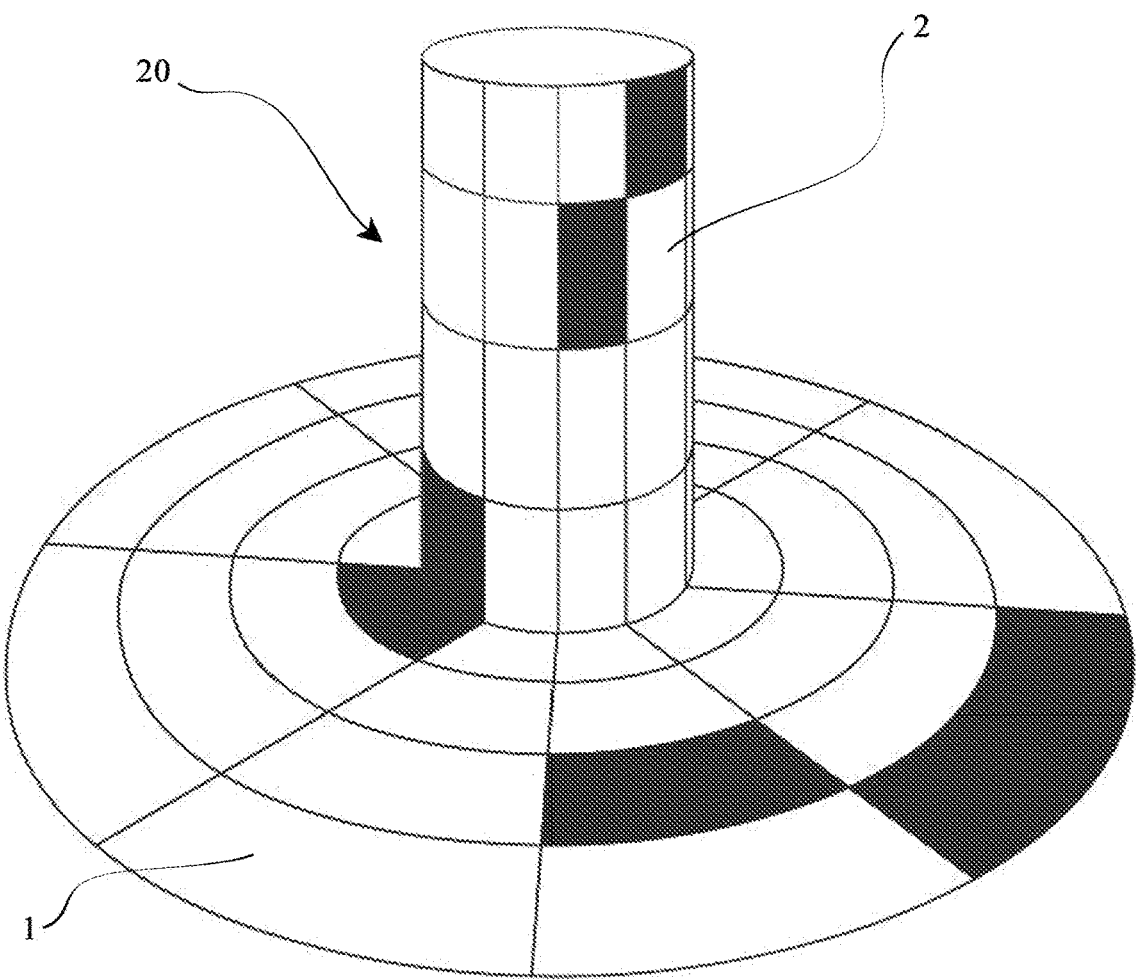
Figure 3:
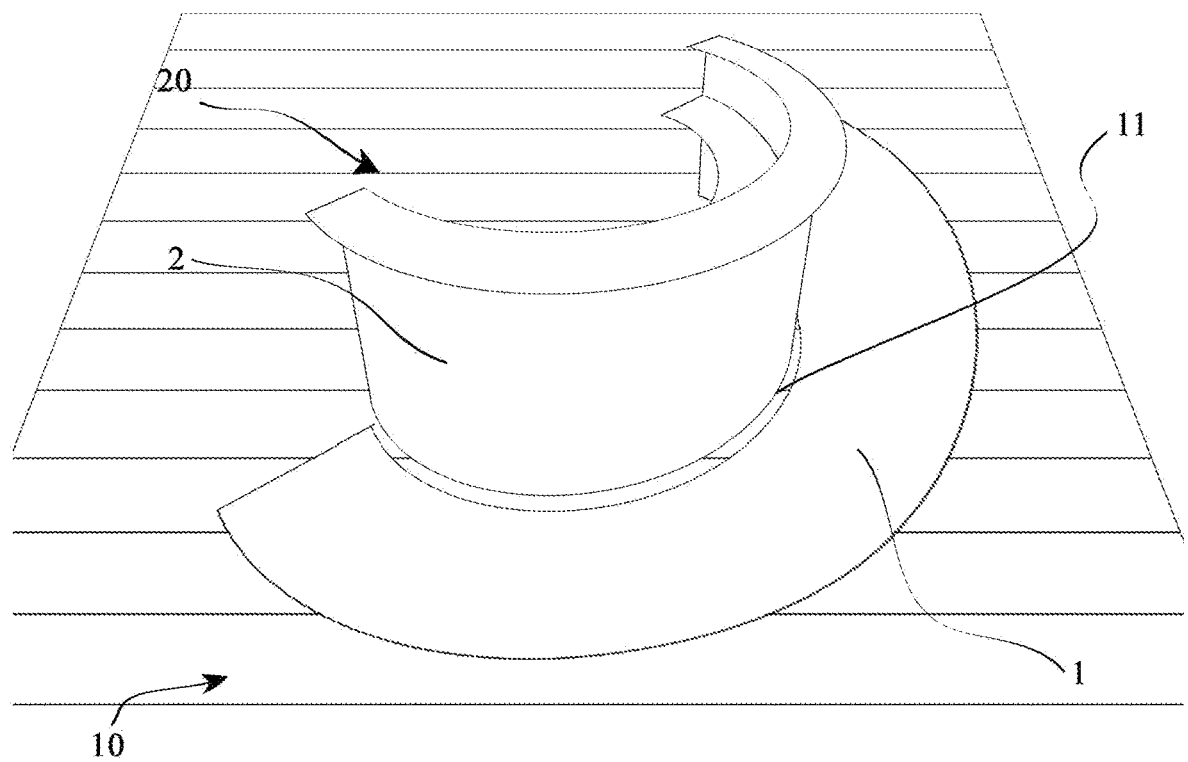
FIG. 3 shows several possible forms of objects and of decorations made with the system of the present invention.
Figure 3:
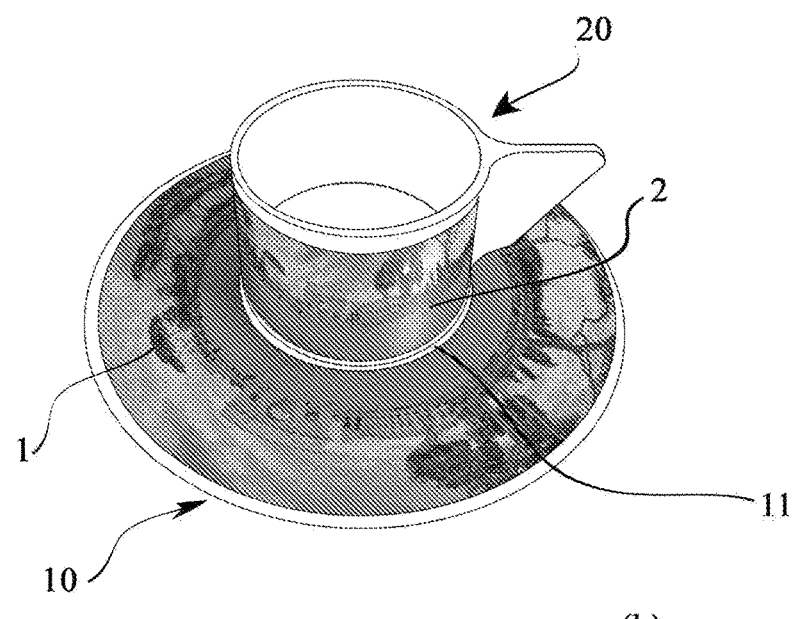
Figure 3:
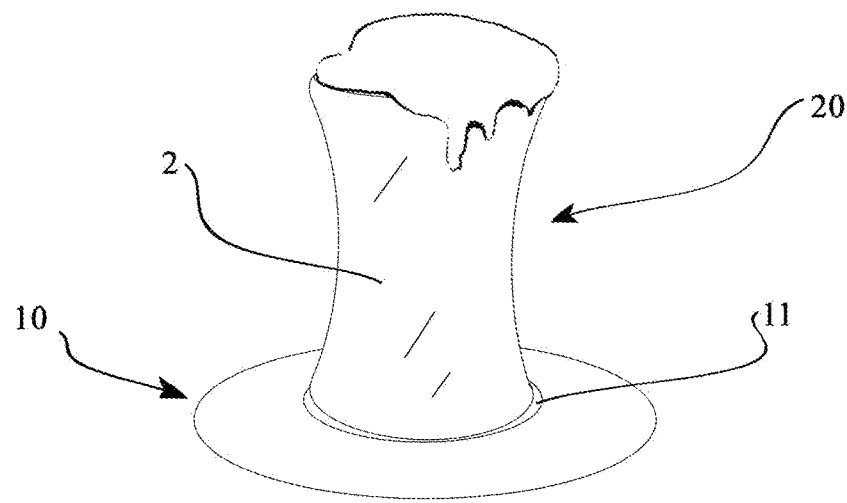
Figure 3:
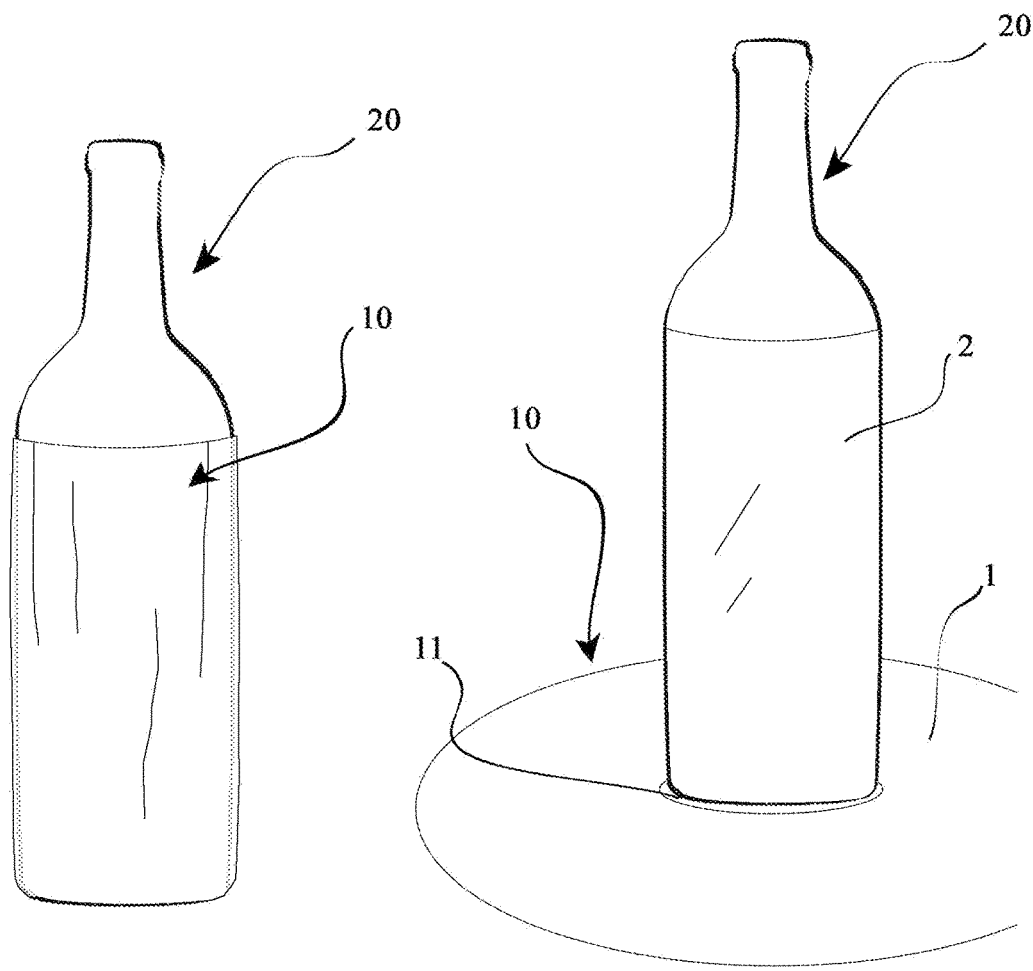
Figure 4:
FIG. 4 shows several steps of the postproduction of the images.
Figure 4:
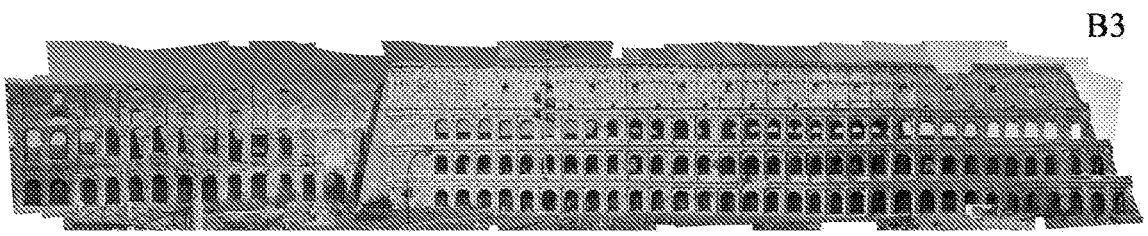
Figure 4:
Figure 4:
Figure 4:
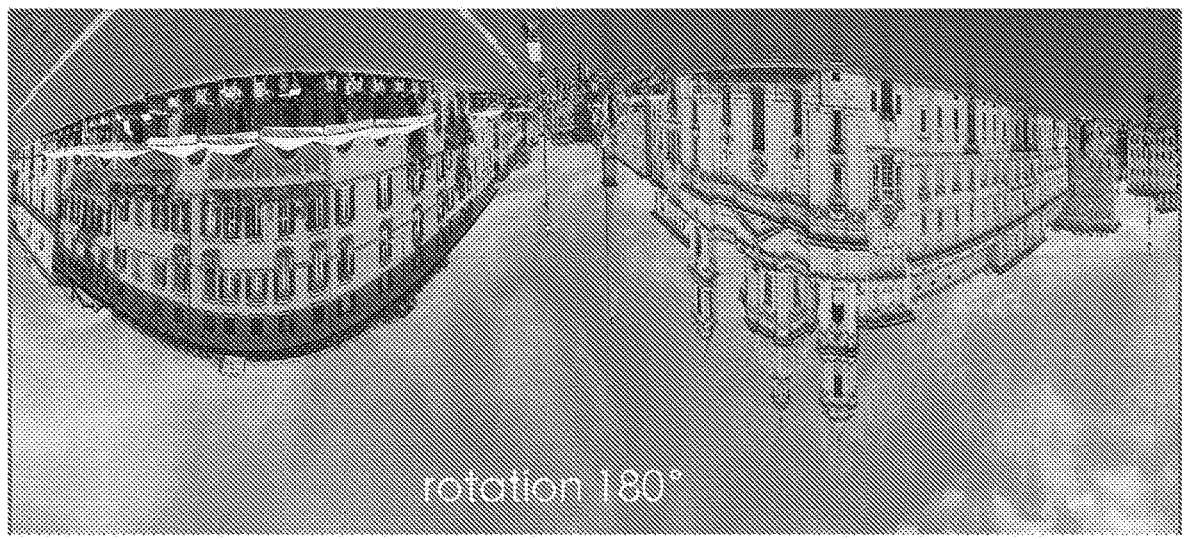
Figure 4:
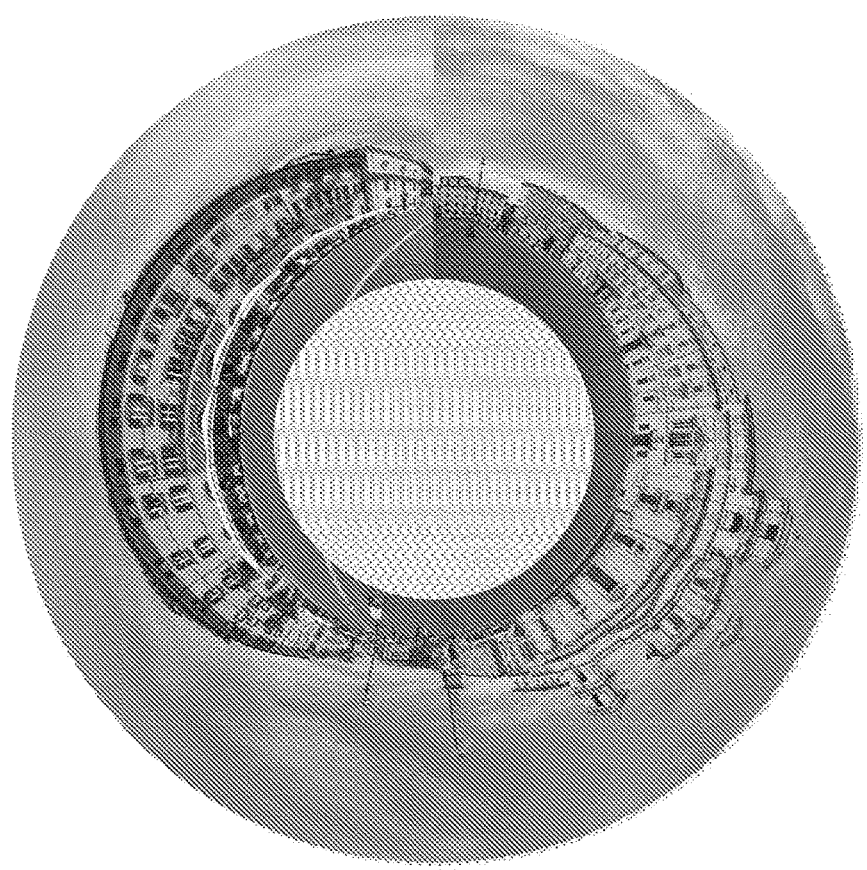

With reference to FIG. 2, the principle of anamorphic deformation of the images is shown, on which the present invention is based. This technique has been known for centuries; due to the multiple applications that the present system allows, it can give rise to decorative or commemorative objects of particular effect on the observer. Some of these objects are represented in FIGS. 3.a, 3.b, 3.c, 3.d but are not limiting in any manner, allowing the system described in detail hereinbelow to be applied to very small objects, with which various forms of souvenirs can be attained, medium-size objects such as furnishing, furniture etc., and large-size objects, including monumental or artistic installations in public places.

The system for the acquisition, post-production and reproduction of the images in fact allows the representation of a monument, hence a single object, or of a square or an open space, over various types of objects.

Figure 1:
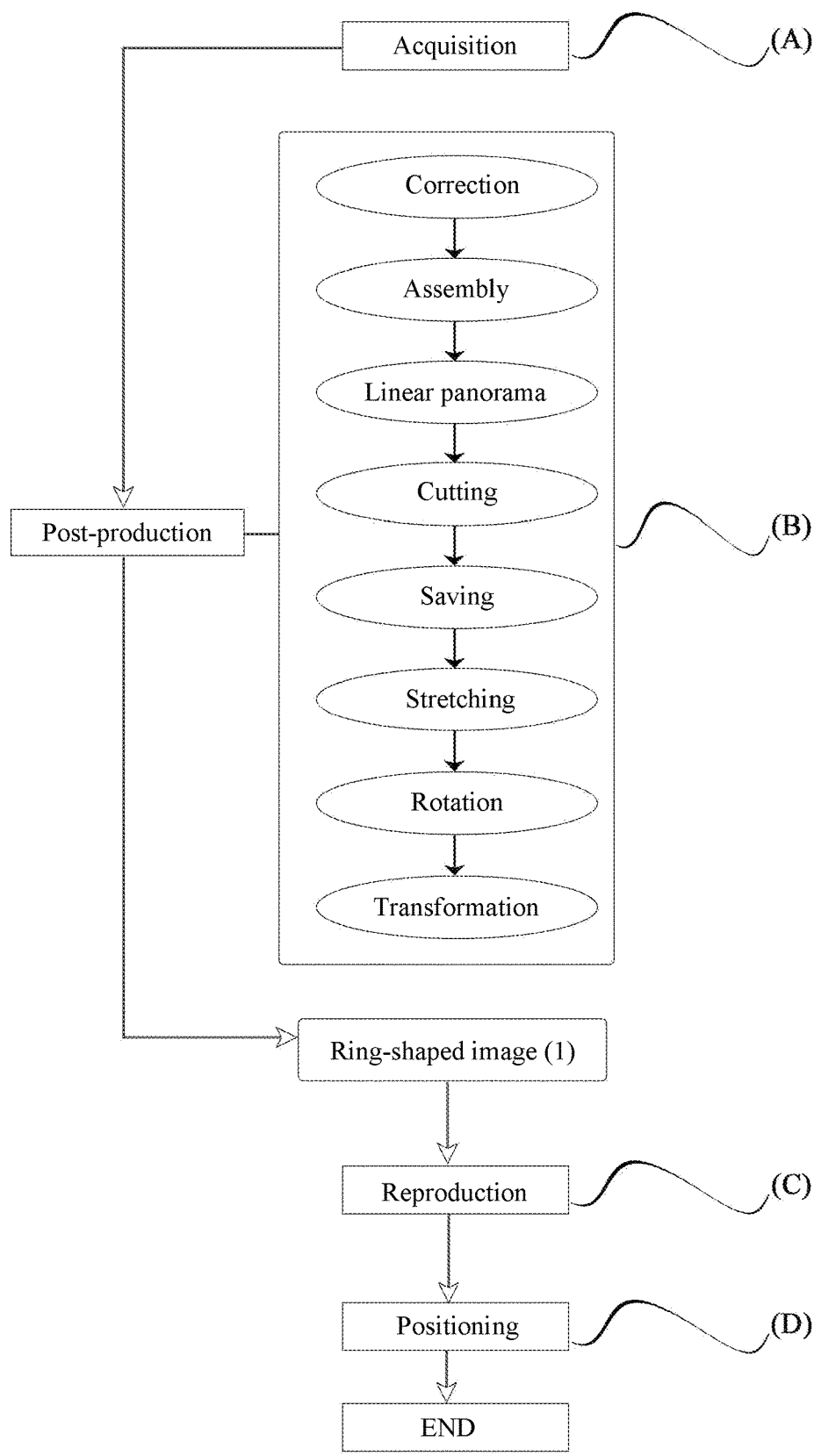
FIG. 1 shows a block diagram of the system for the acquisition, post-production and reproduction of the image on the two-dimensional medium.

Such objects are constituted at least by two elements: a two-dimensional medium 10 and a three-dimensional medium 20. On the first, which has preferably circular form, the deformed image 1 is represented in an anamorphic manner. The three-dimensional medium 20, instead, necessarily has a cylindrical or substantially cylindrical form, and has the outer surface 2 treated with a mirror finish. In this manner, the principle of anamorphosis represented in FIG. 2 is applied to the object in question. The outer surface 2 of the three-dimensional medium 20 in fact will reflect the image 1 represented on the two-dimensional medium 10 so as to eliminate the anamorphic deformations and appear to the observer to be the original object. With reference to FIG. 1, the process is shown for making any one object according to the present invention by means of a block diagram that explains in detail the method of acquisition and post-production in order to obtain the ring-shaped image 1.

Such image 1 is said "ring-shaped image" since it has circular form, in order to be reproduced on the two-dimensional medium 10, and is provided with a central hole 11 that corresponds with the position in which the three-dimensional medium 20 comes to be placed for a correct reflection of the deformed image 1.

The acquisition and post-production method consists of the following successive steps:

A) the acquisition: wherein a user carries out a plurality of photography shots that can be retrieved in two modes based on the object types that one wishes to reproduce. If the object is a monument or the like, the shots must be made in "orbital" mode, hence covering an orbit of 360° around the object itself. In this case, said photography shots must be equidistant from the object. If, however, the object is an open space or a square, acquisition A of said photography shots must be carried out from a fixed observation point while the camera is rotated each time by a predetermined number of degrees. More in detail, in each case, the shots must have focals, preferably 35 mm, preferably be taken in high-definition, preferably in the mode known with the acronym "HDR", and they must have a mutual superimposition comprised between 20% and 50%, preferably between 30% and 40% of the image. In addition, said acquisition step A can occur several times during the day or over multiple days, such that all the photography shots completely lack shading zones. In order for it to be possible to perform the subsequent post-production steps, the shots captured in the different hourly periods must be taken with the same angle and opening of the lens and, in the case of focal panoramas, from the same viewpoint, while in the case of orbital panoramas along the same perimeter line with respect to the subject matter. For an optimal representation of the object to be reproduced, in said acquisition step A, said photography shots must be acquired such that with a number of shots comprised between 40 and 60, 6% to 9% of the object or of the environment to be reproduced is covered. It is obvious that the present invention is also applied if cameras are used at 360° or if any other image capturing device is used which executes the acquisition in an automatic and instantaneous manner. Therefore, cell phones such as smartphones or tablets or similar devices can also be used.

B) the post-production: wherein the previously acquired photography shots are digitally edited, by using suitable software, in order to generate the ring-shaped deformed image 1 according to the principles of anamorphosis. In turn, the post-production step is divided into the following sub-steps:

- B1) the correction of the focal aberrations of the previously-acquired photography shots, preferably carried out by means of the software named "Camera Raw" or similar software programs;
- B2) the assembly, i.e. the photomontage of the correct photography shots next to each other, preferably carried out by means of the software named "Photoshop" or similar software programs;
- B3) the generation of a linear panorama, created by the previously-mentioned photomontage, preferably carried out by means of the software named "Photoshop" or similar software programs; said linear panorama is a rectangular image provided with length/height ratio comprised between 5 and 2.5, preferably 3.88;
- B4) the cutting sub-step, wherein from the rectangular panorama image, the upper edge and the lower edge are cut in order to render said rectilinear edges; preferably the cutting of the upper edge is carried out at a distance from the upper border of the rectangular panorama image comprised between 1 cm and 8 cm, preferably 4 cm; while the cutting of the lower edge is carried out at a distance comprised between 0.2 cm and 5 cm, preferably 2 cm. Also the cutting B4 is preferably carried out by means of the software named "Photoshop" or similar software programs;
- B5) saving, preferably carried by means of the software named "Photoshop" or similar software programs, wherein the image obtained from the preceding cutting step B4 is saved in digital format by setting dimensions comprised between 100×80 and 40×20, preferably 70×40;
- B6) stretching, preferably carried out by means of the software named "Photoshop" or similar software programs, wherein the image obtained from the preceding saving B5 step is deformed height-wise in order to obtain the necessary anamorphic deformation, by setting dimensions comprised between 100× 100 and 20×20, preferably 70×70;
- B7) rotation, wherein the deformed image obtained from the preceding stretching step B6 is rotated by 180°, or overturned;
- B8) transformation, final step of the post-production, it too like the preceding sub-step B7 obtained by using "Photoshop" or similar software programs, wherein said ring-shaped image 1 is obtained by modifying the settings of the coordinates of the deformed and overturned image, obtained from the preceding rotation step B7, from rectangular to polar. More in detail, said image 1 is provided with a height (R-r) given by the difference between its outer radius R and its inner radius r. For a correct representation, said height (R-r) must be comprised between ⅓ and twice the height of the reflecting surface 2 of the three-dimensional medium 20. Preferably, said height (R-r) of said ring-shaped image 1 will be equal to the height of the reflecting surface 2.

Once said anamorphically-deformed ring-shaped image 1 is obtained, one proceeds with its reproduction C on said pre-selected two-dimensional medium 10.

As previously stated, for the correct display of said image 1, at this point, it is sufficient to carry out the positioning D of said three-dimensional medium 20 at the central hole 11 of the ring-shaped image 1, so that—on the outer surface 2 of said three-dimensional medium 20—the correct image is reproduced of the monument or of the space that was previously photographed.

With reference to FIGS. 3.*a*, 3.*b*, 3.*c*, 3.*d*1 and 3.*d*2, only some of the multiple embodiments are shown of the two-dimensional 10 and three-dimensional 20 media on which the present invention is applied.

FIG. 3(*a*) shows the application of the present system to an information desk or to a common reception or to a bar counter or similar furnishing. The furnishing itself forms the three-dimensional medium 20, while the two-dimensional medium 10 is constituted by the same floor on which the furnishing abuts. Alternatively, the ring-shaped image 1 can be reproduced on a mat that at least partially surrounds the counter. It is observed that in each case, a circular or semi-circular form of the two-dimensional medium 10 must be maintained along with a cylindrical or semi-cylindrical form of the three-dimensional medium 20.

FIG. 3(*b*) illustrates the embodiment in which the two-dimensional medium 10 is a coffee cup saucer and the three-dimensional medium 20 is a common small coffee cup. A similar embodiment is that shown in FIG. 3(*c*) in which the invention is applied to a beer mug or to its beverage coaster. Generally, all drinking glasses, cups, wine glasses, pints and the like are objects towards which the present invention is easily applied. It suffices to finish the outer surface 2 thereof with a reflecting or mirroring material and provide the object with a saucer or a beverage coaster associated therewith.

FIGS. 3(*d*1) and 3(*d*2), finally, show a further embodiment comprising a common bottle adapted to act as a three-dimensional medium 20, for which, therefore, the outer surface 2 is reflecting or mirroring. In this case, as two-dimensional medium 10, a common paper decorative element was taken, which renders the bottle a typical gift or commemorative object. Hence, at first sight, there does not externally appear to be any component that reveals the application of the present invention to the object in question. Once the paper element is opened, the inner surface thereof bears said ring-shaped image 1. By spreading out the paper element on any one support surface, said ring-shaped image 1 is reflected by the outer surface 2 of the bottle, revealing the application of the invention.

Among the numerous possible embodiments or better yet for the application of the present invention, there is also that of the "pop-up" card, i.e. a paper card configured by means of expedients known in the field of paper products in order to ensure that, upon opening the card in a book-like fashion, a paper object is automatically and reversibly upwardly projected. In this case, the inner surface of the card acts as a two-dimensional medium 10, and hence bears the ring-shaped image 1. The three-dimensional medium 20 is constituted by a common paper cylinder with mirroring or reflecting outer surface 2 adapted to reversibly raise and lower at the same time as the opening or closing of the card.

This embodiment could for example be constituted by a nice object that recalls a voyage or a place that one wishes to remember.

Finally, it is clear that modifications, additions or variations can be made to the invention described up to now that are obvious for a man skilled in the art, without departing from the protective scope that is provided by the enclosed claims.

The invention claimed is:

1. Method for obtaining 360° panorama images to be continuously displayed by a two-dimensional medium on a cylindrical or conical reflecting surface that simulates an actual view, suitable for a representation of a panorama image that is deformed according to a principle of anamorphosis on any two-dimensional medium, said panorama image being suitable to be reflected on an outer surface of a corresponding three-dimensional medium suitable to be positioned centrally with respect to said two-dimensional medium; a system utilizing a corresponding method constituted by the following subsequent steps:

(A) acquisition: wherein a user takes a plurality of photography shots covering a 360° orbit around an object to be reproduced; said photography shots being provided with a same distance from the object to be reproduced and being provided with focals; said photography shots also being provided with a mutual superimposition comprised between 20% and 50%; said acquisition step (A) occurring several times during the day or over multiple days, for acquiring photography shots taken from a same viewpoint, with a same angle and with a same opening of the lens, of the entire object to be reproduced hit by sunlight or artificial night lighting; said acquisition step (A) being carried out using any image capturing device of an automatic adjustment digital type;

(B) post-production: wherein said photography shots are digitally edited, said post-production step being suitable to generate the panorama image that is deformed according to the principles of anamorphosis:

(B1) correction, wherein any focal aberrations of the previously acquired photography shots are corrected;

(B2) assembly, wherein said previously acquired and corrected photography shots are arranged adjacent to each other in a common photomontage;

(B3) linear panorama, wherein from the previously generated common photomontage, a rectangular panorama image is created that is provided with a height/length ratio comprised between 4.5 and 2.5;

(B4) cutting, wherein from the rectangular panorama image an upper edge and a lower edge are cut in order to make said edges straight; said cutting of the upper edge being carried out at a distance from an upper border of said rectangular panorama image comprised between 1 cm and 8 cm; said cutting of the lower edge being carried out at a distance from a lower border of said rectangular panorama image comprised between 0.2 cm and 5 cm;

(B5) saving, wherein the rectangular panorama image obtained from the previous cutting step (B4) is saved in digital format by setting dimensions comprised between 100×80 and 40×20;

(B6) stretching, wherein the rectangular panorama image obtained from the previous saving step (B5) is deformed height-wise by setting dimensions comprised between 100×100 and 20×20;

(B7) rotation, wherein the deformed image obtained from the previous stretching step (B6) is rotated by 180°, or overturned;

(B8) transformation, wherein a circular image is obtained by modifying settings of coordinates of the deformed and overturned image, obtained from the previous rotation step (B7), from rectangular to polar, thus generating said circular image, provided with an outer radius (R) and an inner radius (r);

(C) reproducing the circular image obtained from the previous post-production step (B) on a two-dimensional medium; said circular image being provided with a central hole corresponding to an observation point suitable to provide a correct viewpoint for returning a correct panorama image;

(D) positioning a three-dimensional medium, associated to said two-dimensional medium, at said central hole of said circular image; said three-dimensional medium being provided with a cylindrical or substantially cylindrical shape and also being provided with a mirroring outer surface, said outer surface being suitable to reproduce said circular image, represented on said two-dimensional medium, thus enabling a correct display thereof.

2. Method for obtaining 360° panorama images to be continuously displayed by a two-dimensional medium on a cylindrical or conical reflecting surface that simulates the actual view, according to claim 1, wherein said step (A) for acquiring said photography shots is carried out from a fixed observation point and said photography shots are taken by rotating the viewpoint by a predetermined number of degrees.

3. Method for obtaining 360° panorama images to be continuously displayed by a two-dimensional medium on a cylindrical or conical reflecting surface that simulates the actual view, according to claim 2, wherein in said acquisition step (A), said photography shots are acquired so as to enable covering between 6% and 9% of an object image or an environment to be reproduced, with a number of photography shots comprised between 40 and 60.

4. Method for obtaining 360° panorama images to be continuously displayed by a two-dimensional medium on a cylindrical or conical reflecting surface that simulates the actual view, according to claim 2, wherein said step (B1) for correcting focal aberrations is carried out using a common dedicated software.

5. Method for obtaining 360° panorama images to be continuously displayed by a two-dimensional medium on a cylindrical or conical reflecting surface that simulates the actual view, according to claim 2, wherein said assembly (B2), linear panorama (B3), cutting (B4), saving (B5), stretching (B6), rotation (B7) and transformation (B8) steps, are carried out using a common dedicated software.

6. Method for obtaining 360° panorama images to be continuously displayed by a two-dimensional medium on a cylindrical or conical reflecting surface that simulates the actual view, according to claim 1, wherein in said acquisition step (A), said photography shots are acquired so as to enable covering between 6% and 9% of an object image or an environment to be reproduced, with a number of photography shots comprised between 40 and 60.

7. Method for obtaining 360° panorama images to be continuously displayed by a two-dimensional medium on a cylindrical or conical reflecting surface that simulates the actual view, according to claim 6, wherein said step (B1) for correcting focal aberrations is carried out using a common dedicated software.

8. Method for obtaining 360° panorama images to be continuously displayed by a two-dimensional medium on a cylindrical or conical reflecting surface that simulates the actual view, according to claim 1, wherein said step (B1) for correcting focal aberrations is carried out using a common dedicated software.

9. Method for obtaining 360° panorama images to be continuously displayed by a two-dimensional medium on a cylindrical or conical reflecting surface that simulates the actual view, according to claim 1, wherein said assembly (B2), linear panorama (B3), cutting (B4), saving (B5), stretching (B6), rotation (B7) and transformation (B8) steps, are carried out using a common dedicated software.

10. Method for obtaining 360° panorama images to be continuously displayed by a two-dimensional medium on a cylindrical or conical reflecting surface that simulates the actual view, according to claim 1, wherein said rectangular panorama image is provided with a height (R-r) given by the difference between said outer radius (R) and said inner radius (r); said height (R-r) being comprised between a value equal to ⅓ of the height of said outer surface of said three-dimensional medium and a value equal to twice the height of said outer surface of said three-dimensional medium.

11. The method of claim 10, wherein said height of said rectangular panorama image is equal to the height of said outer surface of said three-dimensional medium.

12. Method for obtaining 360° panorama images to be continuously displayed by a two-dimensional medium on a cylindrical or conical reflecting surface that simulates the actual view, according to claim 1, wherein said two-dimensional medium is constituted by a common saucer and said three-dimensional medium is constituted by a common small coffee cup.

13. Method for obtaining 360° panorama images to be continuously displayed by a two-dimensional medium on a cylindrical or conical reflecting surface that simulates the actual view, according to claim 1, wherein said two-dimensional medium is constituted by a common beverage coaster and said three-dimensional medium is constituted by a common drinking glass, mug, pint or the like.

14. Method for obtaining 360° panorama images to be continuously displayed by a two-dimensional medium on a cylindrical or conical reflecting surface that simulates the actual view, according to claim 1, wherein said two-dimensional medium is constituted by a common sheet made of paper material suitable to reversibly open in a book-like fashion and said three-dimensional medium is constituted by a common cylinder made of paper material suitable to reversibly rise at the opening of said two-dimensional medium, the entirety forming a common "pop-up" card.

15. Method for obtaining 360° panorama images to be continuously displayed by a two-dimensional medium on a cylindrical or conical reflecting surface that simulates the actual view, according to claim 1, wherein said two-dimensional medium is constituted by a common paper element suitable to reversibly wrap a common bottle, the latter constituting said three-dimensional medium; said two-dimensional medium being suitable to be opened on a support surface, uncovering the circular image and uncovering said mirroring outer surface of said three-dimensional medium.

16. Method for obtaining 360° panorama images to be continuously displayed by a two-dimensional medium on a cylindrical or conical reflecting surface that simulates the actual view, according to claim 1, wherein said three-dimensional medium is constituted by a common furnishing element and said two-dimensional medium is constituted by a common floor or by a common mat surrounding said three-dimensional medium.

17. The method of claim 16, wherein the common furnishing element is a counter, a reception, or a desk.

18. The method of claim 1, wherein:
in the acquisition step, the focals are 35 mm, the photography shots being provided with said mutual superimposition comprised between 30% and 40% and captured using any high definition mode, and the acquisition step is carried out using an image capturing device of a manual adjustment analog type; in the post-production step, the rectangular panorama image is created that is provided with a height/length ratio of 3.88, said cutting of the upper edge is carried out at a distance from the upper border of said rectangular panorama image of 4 cm, said cutting of the lower edge being carried out at a distance from the lower border of said rectangular panorama image of 2 cm, the rectangular panorama image obtained from the cutting step (B4) is saved in digital format by setting dimensions comprised between 70×40, the rectangular panorama image obtained from the saving step (B5) is deformed height-wise by setting dimensions of 70×70; and in the step of reproducing the circular image, the two-dimensional medium is circular-shaped.

\* \* \* \* \*